United States Patent
Maegawa (10) Patent No.: US 6,741,540 B2
(45) Date of Patent: May 25, 2004

(54) OPTICAL PICKUP DEVICE, INFORMATION REPRODUCTION/RECORDING APPARATUS, AND INFORMATION PROCESSING APPARATUS

(75) Inventor: Hiroshi Maegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 412 days.

(21) Appl. No.: 09/736,246

(22) Filed: Dec. 15, 2000

(65) Prior Publication Data

US 2001/0005354 A1 Jun. 28, 2001

(30) Foreign Application Priority Data

Dec. 28, 1999 (JP) .......................................... 11-374247

(51) Int. Cl.$^7$ ................................................ G11B 7/00
(52) U.S. Cl. ................................. 369/124.12; 369/44.42
(58) Field of Search ........................... 369/44.29, 44.41, 369/44.42, 124.12, 124.14, 124.1

(56) References Cited

U.S. PATENT DOCUMENTS 6,154,426 A * 11/2000 Kadowaki ................. 369/44.41
6,222,804 B1 * 4/2001 Yoshizawa ................ 369/44.41
6,282,158 B1 * 8/2001 Kuroiwa ................... 369/44.41

FOREIGN PATENT DOCUMENTS

JP 11-162003 6/1999

* cited by examiner

*Primary Examiner*—Nabil Hindi
(74) *Attorney, Agent, or Firm*—Dickstein Shapiro Morin & Oshinsky LLP

(57) ABSTRACT

The present invention provides an optical pickup device that is resistant to noise in a signal or an RF signal outputted from each light receiving member. Current signals outputted from the light receiving members are converted into voltage signals by I/V converters. The voltage signals are then added up by an adder, and then the added voltage signal is attenuated by an attenuator, so as to obtain an RF signal having the same signal level as the voltage signal outputted from each I/V converter. The RF signal is then transmitted from the optical pickup device to a circuit substrate through a signal line.

8 Claims, 6 Drawing Sheets

FIG.6

OPTICAL PICKUP DEVICE, INFORMATION REPRODUCTION/RECORDING APPARATUS, AND INFORMATION PROCESSING APPARATUS

BACKGROUND OF THE INVENTION

1. Field of the Invention

The present invention relates to an optical pickup device, an information reproduction/recording apparatus, and an information processing apparatus.

2. Description of the Related Art

Japanese Laid-Open Patent Application No. 11-162003 discloses an information reproduction apparatus that reproduces information recorded on an optical disk. In this information reproduction apparatus, light is emitted on the optical disk, and the reflection light from the optical disk is divided and received by a plurality of light receiving members. The current signals obtained from the respective light receiving members are added by an adder, and the resultant signal is then converted into a voltage by a current/voltage converter (hereinafter referred to as "I/V converter").

In accordance with the technique, an amplifier is mounted in the same package as the light receiving members. Since the I/V converter is also mounted on the optical pickup apparatus, a reproduction signal of the optical disk can be resistant to an adverse influence from noise, because it can be extended by 20 cm or more by a voltage signal that is relatively resistant to noise.

The adder that adds up the output signals of the respective light receiving members is also mounted on the optical pickup apparatus. In view of this, an adverse influence from noise can be avoided. In a case where the voltage signals converted from the output signals of the light receiving members are transmitted over a long distance through a plurality (four, for instance) of signal lines, with the noise superimposed on each signal line being N, the noise superimposed on the voltage signal after the adding operation by the adder is $N \times \sqrt{4} = 2 \times N$. On the other hand, after the voltage signals are added up in the optical pickup apparatus, the resultant voltage signal is outputted to the circuit substrate through a signal line, so that the superimposed noise can be equivalent to N.

In the method disclosed in Japanese Laid-Open Patent Application No. 11-162003, however, there are problems with the dynamic range of the circuit. More specifically, since the RF signal is an addition signal of the output signals of the light receiving members, the RF signal has a signal level that is several times (four times in a case of a general optical system, because the four light receiving members are divided from one light receiving element) higher than the output of each of the light receiving members. Accordingly, even if the output range of the RF signal is set in the entire dynamic range, the range of the output signal of each of the light receiving members is limited to one fourth of the dynamic range. Since the output of each of the light receiving members is normally used for generating a servo signal for controlling the operation of the pickup device, it has a low bandwidth, and is relatively resistant to noise. However, with a larger number of light receiving members or a higher reading rate of the optical disk, the servo signal might be adversely influenced by noise.

When information is to be recorded on a DVD-R disk, for instance, the quantity of light for forming recording marks equivalent to "1" is more than 10 times as large as the quantity of light for recording spaces equivalent to "0". To prevent saturation of the output of the RF signal for the large quantity of light for forming the recording marks, the dynamic range of the output of each of the light receiving members during the space recording operation is only 1/40 of the RF signal. As a result, the output signal of each of the light receiving members is limited to an extremely narrow range.

Furthermore, there is another problem with the prior art. To restrict the noise on a signal line that serves as a transmission path, a signal that has the opposite polarity to the RF signal is transmitted at the same time as the RF signal (the differential output), and the difference is removed at the receiving end, so as to remove the noise in the in-phase component superimposed on both signals. Throughout this specification, the complementary signal for the RF signal is referred to as "RF–". In a general differential output operation, if the RF signal is a signal on the positive side with respect to a predetermined reference voltage Vref, the RF– is a signal obtained by inverting the RF signal about the reference voltage Vref. As a result, the RF– has the opposite polarity to the RF signal. Alternatively, when the outputs of the respective light receiving members are added up, the outputs of the light receiving members are inverted at the same time. In this example, the output voltage of RF– is situated on the negative side with respect to the reference voltage Vref. As a result, there is a problem that a twice as wide dynamic range is required.

SUMMARY OF THE INVENTION

It is a general object of the present invention to provide optical pickup devices, information reproduction/recording apparatuses, and information processing apparatuses, in which the above-mentioned problems are eliminated.

A more specific object of the present invention is to provide an optical pickup device in which the signals outputted from the light receiving members are converted into voltage signals and added up, and the resultant addition signal is resistant to noise, by fully utilizing the dynamic range.

Another specific object of the present invention is to provide an optical pickup device in which the signals outputted from the light receiving members are converted into voltage signals and then added up, and in-phase noise is removed from the resultant addition signal and its complementary signal, without widening the dynamic range.

Yet another specific object of the present invention is to realize the removal of in-phase noise at a low production cost.

Still another specific object of the present invention is to perform the removal of the in-phase noise, using a complete complementary signal, without causing a signal delay.

The above objects of the present invention are achieved by an optical pickup device that comprises:
a light source that emits light onto an object;
a plurality of light receiving members that receive divided reflection light from the object; and
a signal processing circuit that converts a current signal outputted from each of the plurality of light receiving members into a voltage signal, performs an adding operation on the voltage signals, and performs attenuation on the added voltage signal.

With this optical pickup device, the dynamic range is limited so as to prevent the signal level of each signal from becoming too small. Thus, the signals outputted from both the light receiving members and the signal processing circuit can be resistant to an adverse influence from noise, fully utilizing the dynamic range. The attenuation is carried out in such a manner that the signal obtained by converting the output signals of the light receiving members into the voltage signals, adding the voltage signals, and attenuating the added voltage signal has substantially the same level as the signal obtained by converting the output signal of a single light receiving member into a voltage signal.

The above optical pickup device further comprises a complementary signal generating circuit that generates a complementary signal of the added voltage signal by attenuating a signal that has a waveform symmetrical to the added voltage signal about a predetermined reference voltage.

Accordingly, the in-phase signal of the signal outputted from the signal processing circuit can also be resistant to an adverse influence from noise, thus fully utilizing the dynamic range.

The above objects of the present invention are also achieved by an optical pickup device that comprises:

a light source that emits light onto an object;

a plurality of light receiving members that receive divided reflection light from the object;

a signal processing circuit that converts a current signal outputted from each of the plurality of light receiving members into a voltage signal, and performs an adding operation on the voltage signals; and a complementary signal generating circuit that generates a complementary signal of the added voltage signal by performing a predetermined level shift on a signal that has a waveform symmetrical to the added voltage signal about a predetermined reference voltage.

With this optical pickup device, the difference in signal level between the signal outputted from the signal processing circuit and its complementary signal is small. Thus, the in-phase noise can be removed from the signal outputted from the signal processing circuit and its complementary signal, without widening the dynamic range.

In the above optical pickup device, the signal processing circuit comprises:

a plurality of I/V converters, each of which converts the current signal outputted from each corresponding one of the light receiving members into the voltage signal; and an adder that adds up the voltage signals, and the complementary signal generating circuit comprises:

an inversion circuit that receives the added voltage signal outputted from the signal processing circuit, and generates the signal that has the waveform symmetrical to the added voltage signal about the predetermined reference voltage; and a shift circuit that generates the complementary signal by performing the predetermined level shift on the signal generated by the inversion circuit.

With this optical pickup device, the complementary signal generating circuit constituted by the inversion circuit and the shift circuit generates a complementary signal, using the output signal of the signal processing circuit. Thus, the number of circuit components in the complementary signal generating circuit can be reduced, and the production cost of the optical pickup device can be lowered.

In the above optical pickup device, the signal processing circuit comprises:

a plurality of I/V converters, each of which converts the current signal outputted from each of the light receiving members into the voltage signal; and an adder that adds up each voltage signal, and the complementary signal generating circuit comprises:

an inversion adder that generates the signal having the waveform symmetrical to the added voltage signal about the predetermined reference voltage; and a shift circuit that generates the complementary signal by performing the predetermined level shift on the signal generated by the inversion adder.

With this optical pickup device, the difference in number of circuit components is small between the signal processing circuit and the complementary signal generating circuit. Accordingly, a delay of the complementary signal becomes shorter, making the complementary signal more complete.

In the above optical pickup device, the signal processing circuit further performs an attenuation operation on the added voltage signal; and the complementary signal generating circuit comprises an attenuator that attenuates the complementary signal.

With this optical pick up device, the level of the signal outputted from each of the light receiving members can be prevented from becoming too small. Thus, the signals outputted from both the light receiving members and the signal processing circuit can be resistant to noise, fully utilizing the dynamic range.

The above objects of the present invention are also achieved by an information reproduction/recording apparatus that can optically perform either one or both of information reproduction and recording on a recording medium, said apparatus comprising:

an optical pickup device that includes a light source for emitting light onto the recording medium, and a plurality of light receiving members that receive divided reflection light from the recording medium;

a moving device that moves the optical pickup device;

a detector unit that detects an irradiation spot of the light on the recording medium;

a control unit that controls the irradiation spot to follow a read or write position on the recording medium based on a result of the detection by the detector unit; and a reproduction unit that is disposed independently of the optical pickup device, and is connected to the optical pickup device by a transmission path for transmitting and receiving a voltage signal outputted from a signal processing circuit and a complementary signal generating circuit, so as to reproduce information stored in the recording medium based on the voltage signal outputted from the signal processing circuit.

With this information reproduction/recording apparatus, the same effects as with the above-described optical pickup device can also be achieved.

The above objects of the present invention are also achieved by an information processing apparatus provided with the above-described information reproduction/recording apparatus, in which various information processing operations can be performed.

With this information processing apparatus, the same effects as with the above-described information reproduction/recording apparatus can also be achieved.

Other objects and further features of the present invention will become more apparent from the following description taken in conjunction with the accompanying drawings.

DESCRIPTION OF THE PREFERRED EMBODIMENTS

The following is a description of embodiments of the present invention, with reference to the accompanying drawings.

Figure 1:
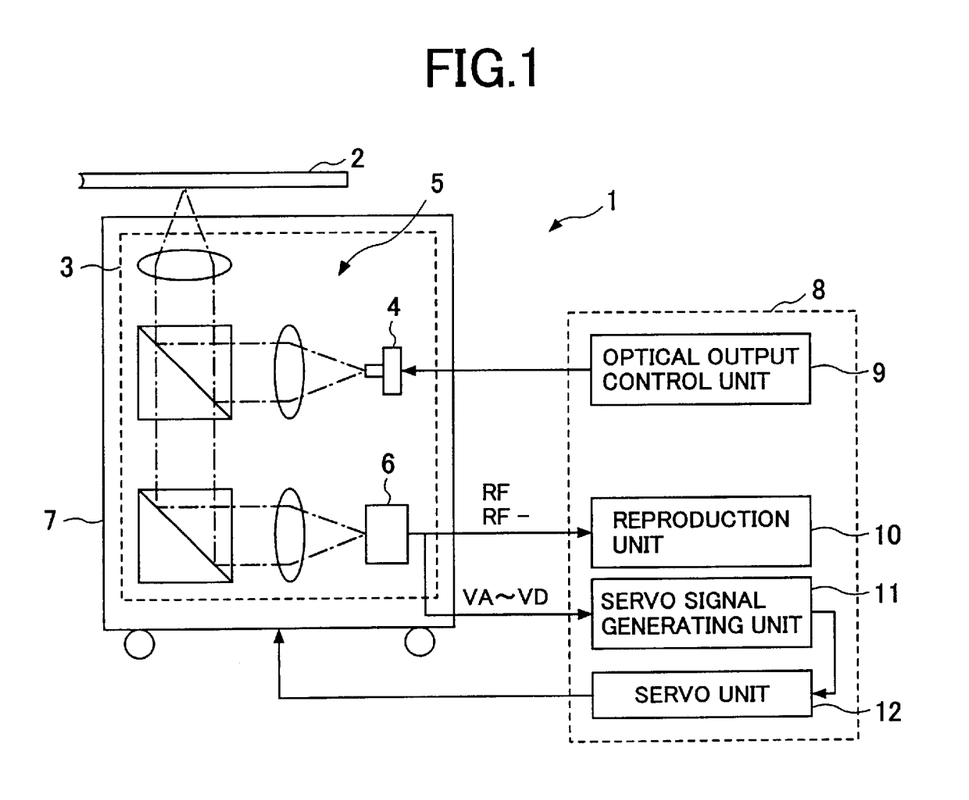
FIG. 1 is a block diagram showing the structure of an optical disk drive apparatus in accordance with a first embodiment of the present invention.

FIG. 1 is a block diagram showing the structure of an optical disk drive apparatus 1 in accordance with a first embodiment of the present invention. This optical disk drive apparatus 1 embodies an information reproduction/recording apparatus of the present invention, and reproduces information recorded on a recording media, such as an optical disk 2, from which recording information can be optically reproduced.

As shown in FIG. 1, the optical disk 2 is rotated by a drive system (not shown). An optical pickup device 3 comprises a light source 4, an optical system 5, and a signal processing unit 6. The light source 4 irradiates the optical disk 2 with light, which is converged onto the optical disk 2 through the optical system 5. The signal processing unit 6 receives the reflection light from the optical disk 2, and converts the reflection light into electric signals and then outputs them to the outside of the optical pickup device 3. A moving device 7 moves the optical pickup device 3 so that the light emitted from the optical pickup device 3 is moved to a desired location on the optical disk 2.

A circuit substrate 8 is fixed onto the optical disk drive apparatus 1 separately from the optical pickup device 3, and is connected to the optical disk drive apparatus 1 by a signal line that serves as a transmission path for exchanging signals with the optical pickup device 3. The circuit substrate 8 has mounted thereon an optical output control unit 9 that controls an output of the light source 4, a reproduction unit 10 that reproduces information recorded on the optical disk 2 in accordance with an RF signal and an RF- signal transmitted from the signal processing unit 6, a servo signal generating unit 11 that serves as a detection unit for detecting the location of a light spot on the optical disk 2 in accordance with VA to VD signals (described later) transmitted from the signal processing unit 6, and a servo unit 12 that serves as a control unit for controlling the drive of the mobile unit 7 in accordance with a signal transmitted from the servo signal generating unit 11.

In a case where the optical disk drive apparatus 1 is applied to an information reproduction apparatus that can also record information onto the optical disk 2, a device for preparing data of information to be recorded onto the optical disk 2, and a circuit that generates recording light to irradiate the optical disk 2 by converting a signal outputted from the optical output control unit 9 to the light source 4 based on the data are also mounted on the information recording reproduction apparatus.

Figure 2:
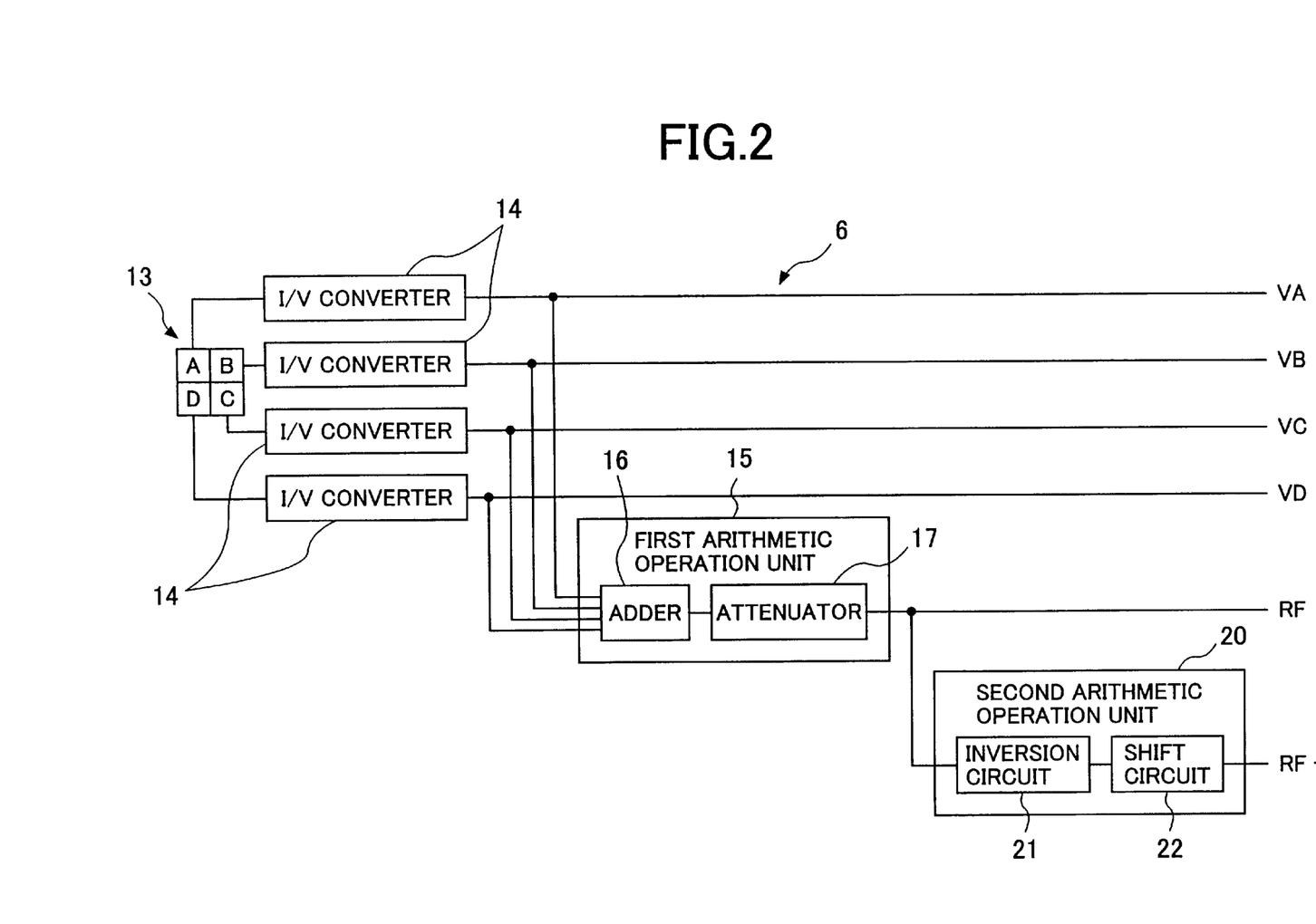
FIG. 2 is a block diagram showing the circuit structure of a signal processing unit shown in FIG. 1.

FIG. 2 is a block diagram showing the circuit structure of the signal processing unit 6. As described above, the signal processing unit 6 is mounted on the optical pickup device 3, and the output of the signal processing unit 6 is transmitted to the circuit substrate 8 through the signal line, which is a relatively long transmission path.

The signal processing unit 6 receives divided reflection light from the optical disk 2, and includes a light receiving element 13 divided into a plurality of light receiving members (in this embodiment, the light receiving element 13 is divided into four members A to D) that convert the divided reflection light into current signals. The current signals outputted from the light receiving members A to D are converted into voltage signals VA to VD by I/V converters 14.

Figure 3:
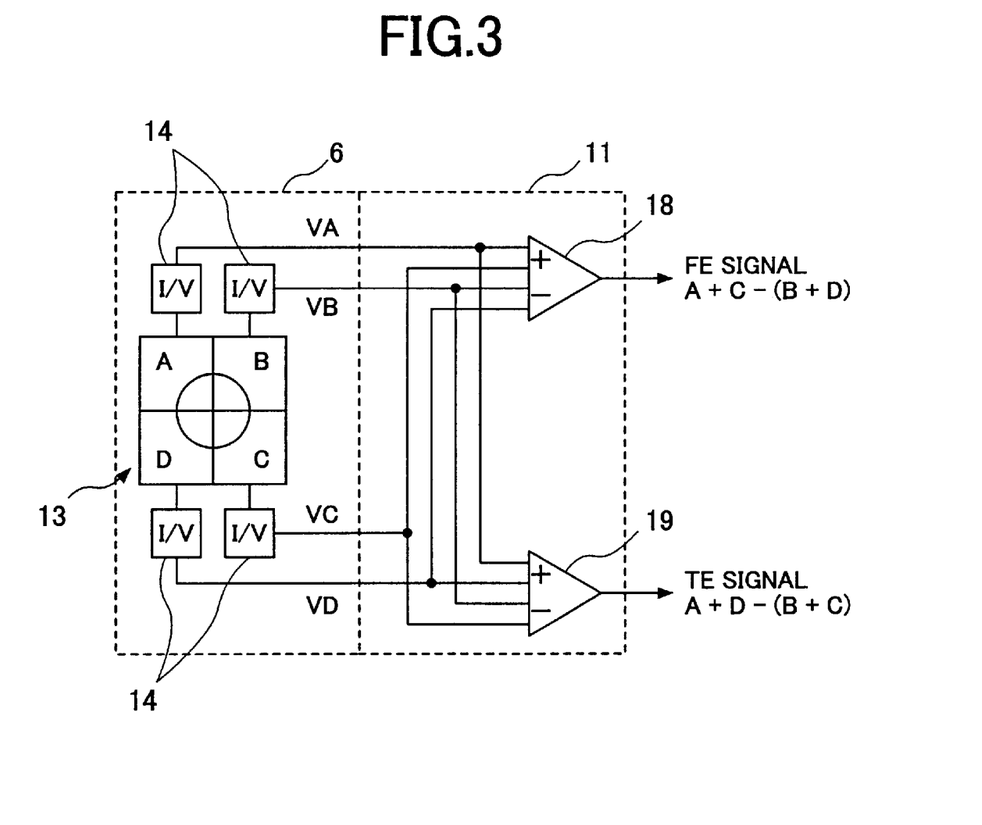
FIG. 3 is a block diagram illustrating a circuit that generates an FE signal and a TE signal in the optical disk drive apparatus of FIG. 1.

The voltage signals VA to VD are outputted to the servo signal generating unit 11 of the circuit substrate 8 via the signal line, and are used for generating various servo signals including an FE (focusing error) signal and a TE (tracking error) signal. The FE signal is a signal that indicates the focus of a light spot emitted from the optical pickup device 3 onto the optical disk 2 and the positional information as to the surface of the optical disk 2. As shown in FIG. 3, the FE signal can be determined by a subtracter 18 using an astigmatism method. The TE signal is a signal that indicates the positional information of a light spot in the radial direction of the optical disk 2. As shown in FIG. 3, the TE signal can be determined by a subtracter 19 using a push-pull technique, for instance.

As shown in FIG. 2, a first arithmetic unit 15 of the signal processing unit 6 comprises an adder 16 and an attenuator 17. The adder 16 adds up the outputs of the I/V converters 14, and the attenuator 17 returns the amplitude of the signal to the same level as each signal level prior to the adding process, thereby generating the RF signal. It is also possible to directly add the current signals, which are the outputs of the light receiving members A to D, without using the voltage signals, which are the outputs of the I/V converters 14. The added current signals are then I/V converted. In this case, the amplification factor and the I/V conversion rate are set so that the output levels of the signals VA to VD and the RF signal are substantially equalized. The I/V converters 14, the adder 16, and the attenuator 17 constitute a signal processing circuit. Since the output signals VA to VD of the light receiving members A to D are not outputted to the servo signal generating unit 11, it is necessary to generate a servo signal for controlling the moving device 7 from output signals of other light receiving members.

As shown in FIG. 2, a second arithmetic operation unit 20 of the signal processing unit 6 constitutes a complementary signal generating circuit, and generates the RF- signal, which is the complementary signal of the RF signal. The RF- signal has the same amplitude characteristics as the RF signal, but has the opposite polarity from the RF signal about a predetermined reference voltage. Accordingly, an inversion circuit 21 in the second arithmetic operation unit 20 generates an inversion signal of the RF signal outputted from the first arithmetic operation unit 15.

Figure 4A:
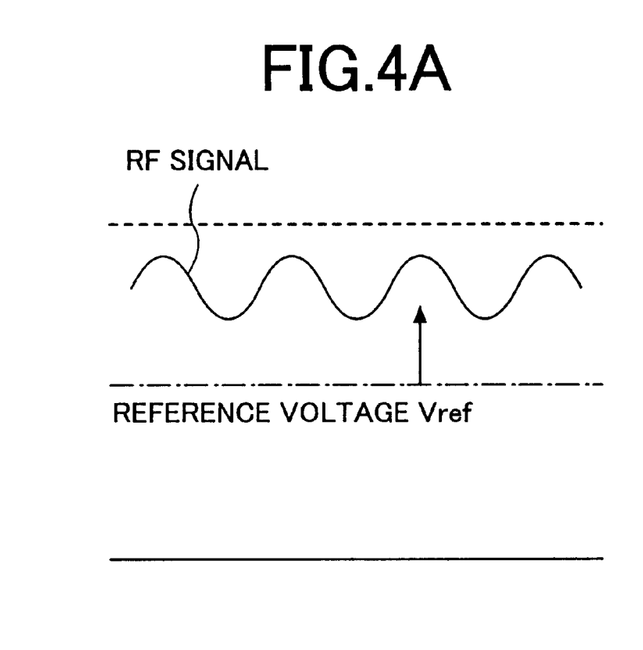
FIGS. 4A and 4B are graphs illustrating the generation of an RF-signal in the optical disk drive apparatus of FIG. 1.
Figure 4B:
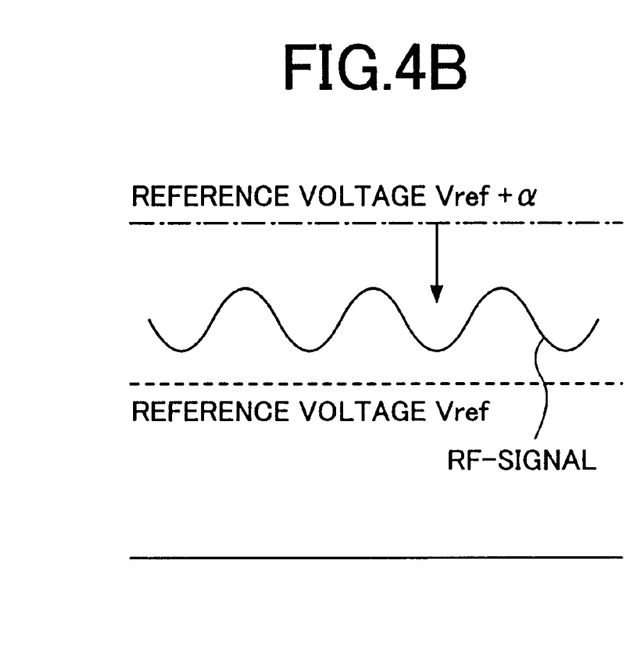

As shown in FIGS. 4A and 4B, the output ranges of the RF signal and the signals VA to VD are on the positive side of the reference voltage Vref used in the inversion circuit 21. In the prior art, the RF signal is inverted to the RF- signal centered with respect to the reference voltage Vref. As a result, an output range is required on both the positive side and the negative side centered with respect to the reference voltage Vref (not shown). Such a side output range makes the circuit structure more complicated, and becomes a hindrance to a high-speed operation.

In view of this, the second arithmetic operation unit 20 also includes a shift circuit 22 having a voltage shift function, and the reference voltage for generating the RF-signal is changed to a different value from the reference voltage Vref for the RF signal, so that the output range of the RF- signal becomes equal to the output range of the RF signal, as shown in FIG. 4B. Here, the reference level of the signal is indicated by the reference voltage Vref+α. A signal having a waveform symmetrical to the RF signal about the level of the reference voltage Vref is generated by the inversion circuit 21. The shift circuit 22 then performs a voltage level shift so as to add the voltage α to the generated signal.

With this optical disk drive apparatus 1, the signals converted onto the voltage signals are then attenuated by the attenuator 17, and outputted as the RF signal and the RF- signal. Accordingly, the dynamic range of the signals is limited to within the dynamic ranges of the RF signal and the RF- signal, and the signal level of each of the output signals VA to VD of the respective light receiving members A to D can be prevented from decreasing by an excessive amount. Thus, the RF signal, the RF- signal, and the output signals VA to VD, are all resistant to noise by effectively utilizing the dynamic ranges.

Also, the shift circuit 22 performs a voltage level shift, so as to prevent a big difference in signal level between the RF signal and the RF- signal, which is the complementary signal of the RF signal. Thus, in-phase noise can be eliminated from the RF signal and the RF- signal, without widening the dynamic ranges.

In the circuit shown in FIG. 2, the second arithmetic operation unit 20 generates the RF- signal, using the output signal of the first arithmetic operation unit 15. However, the second arithmetic operation unit 20 may have a structure shown in FIG. 5. More specifically, the output signals of the I/V converters 14 are inputted directly into the second arithmetic operation unit 20, and the inputted signals are inverted and added up by an inversion adder 23 that has both functions of the adder 16 and the inversion circuit 21 shown in FIG. 2. A voltage level shift operation is then performed by the shift circuit 22 so as to add a voltage α to the added voltage signal. The resultant voltage signal is then attenuated by an attenuator 24 so as to generate the RF- signal.

Figure 5:
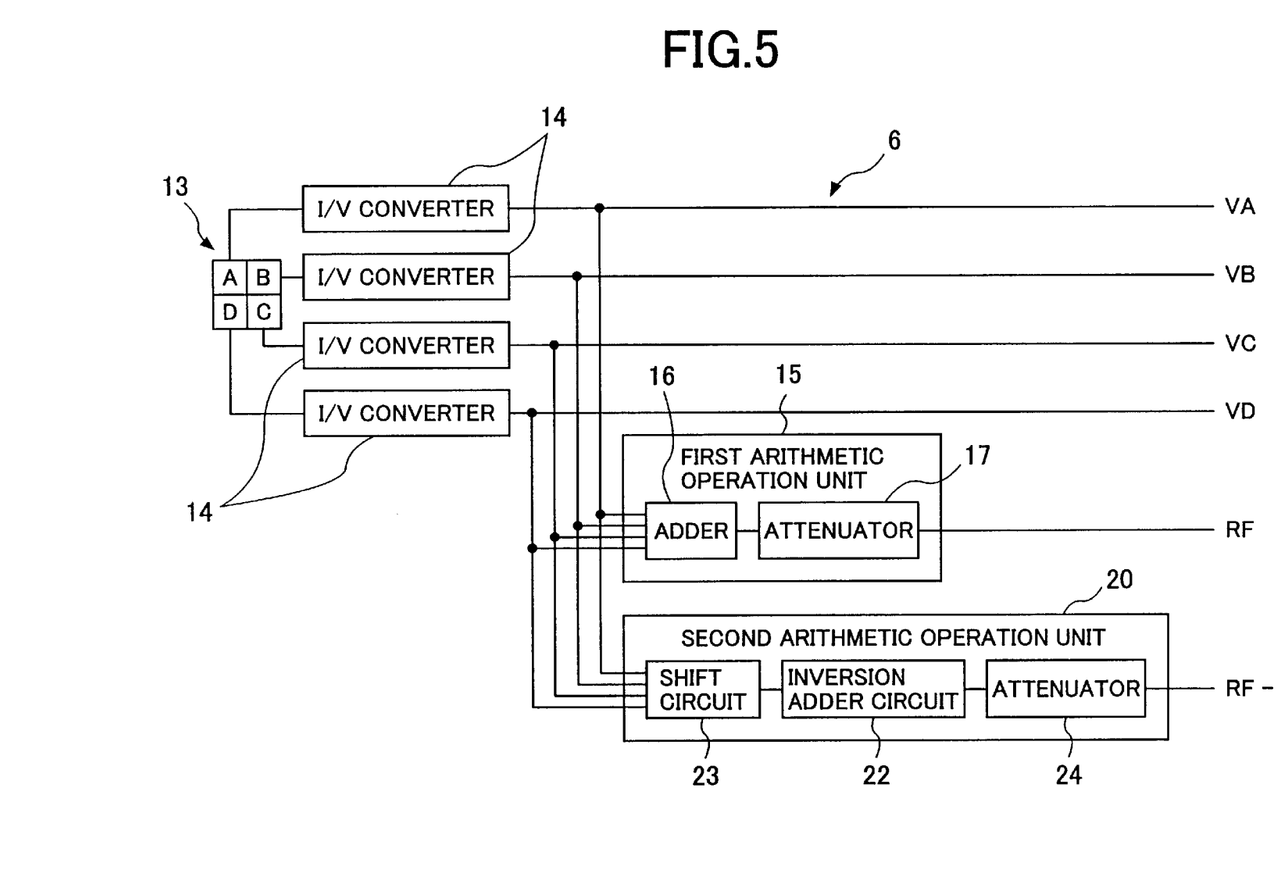
FIG. 5 is a block diagram illustrating the circuit structure of a modification of the signal processing unit shown in FIG. 1.

In the circuit shown in FIG. 5, the difference in a number of circuits that the output signal of the respective light receiving members A to D need to pass through until the generation of the RF signal and the RF- signal is smaller than in the circuit shown in FIG. 2. Accordingly, signal delay occurs less frequently, and it is easier to generate an RF- signal as a complete complementary signal. However, the circuit shown in FIG. 2 can be formed by a smaller number of circuit components than the circuit shown in FIG. 5, and thus requires a lower production cost for the optical disk drive apparatus 1.

In the above examples, the optical disk drive apparatus 1 is used only for reproducing recorded data from the optical disk 2. In a case where the optical disk drive apparatus 1 is used for both reproducing and recording, or only for recording, a structure for recording information on the optical disk 2 should be formed as follows.

The optical output control unit 9 is provided with a structure for emitting recording light from the light source 4 in accordance with the information data to be recorded on the optical disk 2. Since such a structure is known, an explanation for it is omitted in this specification. During a recording operation on the optical disk 2 such as a CD-R on which information can be optically recorded, a large quantity of light, larger than 10 mW, is emitted on the surface of the optical disk 2 so as to form recording marks, and a small quantity of light, smaller than 1 mW, is emitted so as to form space marks. To form the recording marks, a pulse-like light is emitted. Therefore, a signal for space formation by emitting a constant amount of light is generally used for servo control of the moving device 7. Furthermore, to check the recording condition on the optical disk 2, it is necessary not to saturate the signal obtained by adding up the outputs of the respective light receiving members A to D.

The signal obtained by adding up the outputs of the respective light receiving members A to D without attenuation has an amplitude four times as high as the amplitude of each of the signals. If the addition signal is adjusted to be as wide as the dynamic range of the input-side circuit without saturation, the maximum signal amplitude of each of the voltage signals VA to VD is equal to one fourth of the dynamic range of the addition signal. Accordingly, the signal level of each of the voltage signals VA to VD for outputting reproduction power is as extremely low as ¼×1 mW/10 mW=¹⁄₄₀, which is susceptible to an adverse influence from noise. In this embodiment, however, the attenuators 17 and 24 protect the voltage signals VA to VD, the RF signal, and the RF- signals from an adverse influence from noise by effectively utilizing the dynamic range.

[Second Embodiment]

Figure 6:
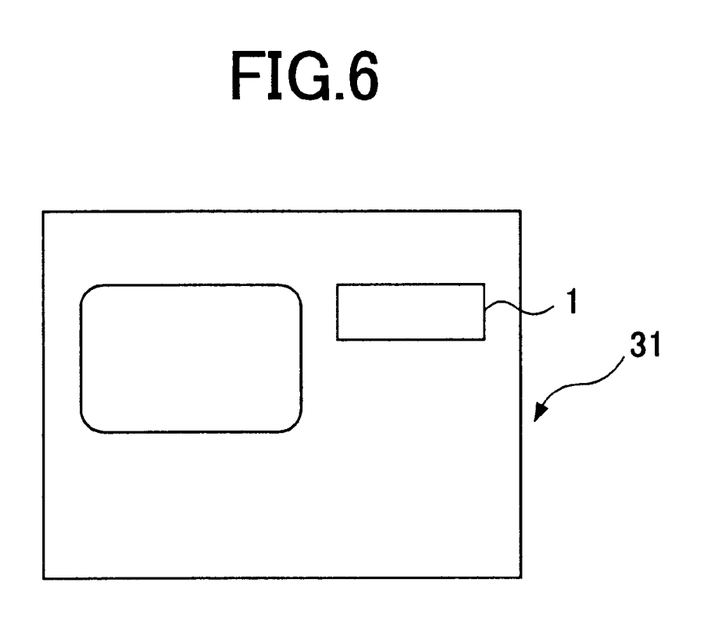
FIG. 6 is a block diagram showing the structure of an information processing apparatus in accordance with a second embodiment of the present invention.

FIG. 6 is a block diagram showing the structure of an information processing apparatus 31 in accordance with a second embodiment of the present invention. This information processing apparatus 31 is an electronic computer such as a personal computer that can perform various information processing operations. Since the basic structure and operations of the apparatus are known, explanations for them are omitted in this description. The information processing apparatus 31 comprises the optical disk drive apparatus, and can reproduce information recorded on the optical disk 2 and record desired information on the optical disk 2.

The present invention is not limited to the specifically disclosed embodiments, but variations and modifications may be made without departing from the scope of the present invention.

The present invention is based on Japanese priority application No. 11-374247, filed on Dec. 28, 1999, the entire contents of which are hereby incorporated by reference.

What is claimed is:

1. An optical pickup device comprising:
   a light source to emit light onto an object;
   a plurality of light receiving members to receive divided reflection light from the object;
   a signal processing circuit to convert current signals output from each of the plurality of light receiving members into voltage signals, add the voltage signals to obtain an added voltage signal, and attenuate a level of the added voltage signal; and
   a complementary signal generating circuit to generate a complementary signal of the added voltage signal by attenuating a signal that has a waveform symmetrical to that of the added voltage signal about a reference voltage.

2. An optical pickup device comprising:
   a light source that emits light onto an object;
   a plurality of light receiving members that receive divided reflection light from the object;

a signal processing circuit that converts a current signal outputted from each of the plurality of light receiving members into a voltage signal, and performs an adding operation on the voltage signals; and a complementary signal generating circuit that generates a complementary signal of the added voltage signal by performing a predetermined level shift on a signal that has a waveform symmetrical to the added voltage signal about a predetermined reference voltage.

3. The optical pickup device as claimed in claim 2, wherein the signal processing circuit comprises:
  a plurality of I/V converters, each of which converts the current signal outputted from a corresponding one of the light receiving members into the voltage signal; and
  an adder that adds up the voltage signals, and the complementary signal generating circuit comprises:
  an inversion circuit that receives the added voltage signal outputted from the signal processing circuit, and generates the signal that has the waveform symmetrical to the added voltage signal about the predetermined reference voltage; and
  a shift circuit that generates the complementary signal by performing the predetermined level shift on the signal generated by the inversion circuit.

4. The optical pickup device as claimed in claim 2, wherein the signal processing circuit comprises:
  a plurality of I/V converters, each of which converts the current signal outputted from each of the light receiving members into the voltage signal; and
  an adder that adds up each voltage signal; and the complementary signal generating circuit comprises:
  an inversion adder that generates a signal having the waveform symmetrical to the added voltage signal about the predetermined reference voltage; and
  a shift circuit that generates the complementary signal by performing the predetermined level shift on the signal generated by the inversion adder.

5. The optical pickup device as claimed in claim 2, wherein:

the signal processing circuit further performs an attenuation operation on the added voltage signal; and the complementary signal generating circuit comprises an attenuator that attenuates the complementary signal.

6. An information reproduction/recording apparatus to optically perform either one or both of information reproduction from and information recording on a recording medium, said apparatus comprising:

an optical pickup device including a light source to emit light onto the recording medium, and a plurality of light receiving members to receive divided reflection light from the recording medium;

a moving device to move the optical pickup device;

a detector unit to detect a light spot of the light irradiated on the recording medium;

a control unit to control the light spot to follow a read or write position on the recording medium based on a result of the detection by the detector unit; and a reproduction unit provided independently of the optical pickup device, coupled to the optical pickup device by a transmission path for transmitting and receiving voltage signals output from a signal processing circuit and a complementary signal generating circuit which are provided within the optical pickup device, so as to reproduce information recorded on the recording medium based on the voltage signals output from the signal processing circuit, said complementary signal generating circuit generating a complementary signal of a voltage signal output from the signal processing circuit by attenuating a signal having a waveform symmetrical to that of the voltage signal output from the signal processing circuit about a reference signal.

7. An information processing apparatus for performing various information processing operations, comprising:

an information reproduction/recording apparatus comprising:
  an optical pickup device including a light source to emit light onto a recording medium, and a plurality of light receiving members to receive divided reflection light from the recording medium;
  a moving device to move the optical pickup device;
  a detector unit to detect a light spot of the light irradiated on the recording medium;
  a control unit to control the light spot to follow a read or write position on the recording medium based on a result of the detection by the detector unit; and
  a reproduction unit provided independently of the optical pickup device, coupled to the optical pickup device by a transmission path for transmitting and receiving voltage signals output from a signal processing circuit and a complementary signal generating circuit which are provided within the optical pickup device, so as to reproduce information recorded on the recording medium based on the voltage signals output from the signal processing circuit,
  said complementary signal generating circuit generating a complementary signal of a voltage signal output from the signal processing circuit by attenuating a signal having a waveform symmetrical to that of the voltage signal output from the signal processing circuit about a reference signal.

8. An optical pickup device comprising:

a light source to emit light onto an object;

a plurality of light receiving elements to receive divided reflection light from the object;

a signal processing circuit to convert current signals output from each of the plurality of light receiving elements into voltage signals, add the voltage signals to obtain an added voltage signal, and perform an attenuation on the added voltage signal; and a complementary signal generating circuit to generate a complementary signal of the added voltage signal by attenuating a signal having a waveform symmetrical to that of the added voltage signal about a reference signal.

* * * * *